(12) United States Patent
Hasegawa

(10) Patent No.: US 10,563,762 B2
(45) Date of Patent: Feb. 18, 2020

(54) VEHICLE SPEED-CHANGE SYSTEM

(71) Applicant: SUZUKI MOTOR CORPORATION, Hamamatsu-Shi, Shizuoka (JP)

(72) Inventor: Kei Hasegawa, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 476 days.

(21) Appl. No.: 15/592,424

(22) Filed: May 11, 2017

(65) Prior Publication Data
US 2017/0350505 A1    Dec. 7, 2017

(30) Foreign Application Priority Data

Jun. 6, 2016 (JP) .................................. 2016-112835

(51) Int. Cl.
| | |
|---|---|
| F16H 63/18 | (2006.01) |
| F16H 3/32 | (2006.01) |
| F16H 63/30 | (2006.01) |
| F16H 63/32 | (2006.01) |
| B62M 25/08 | (2006.01) |
| F16H 3/16 | (2006.01) |
| B62M 11/06 | (2006.01) |
| B62M 25/00 | (2006.01) |
| F16H 1/28 | (2006.01) |

(52) U.S. Cl.
CPC ............ F16H 63/18 (2013.01); B62M 11/06 (2013.01); B62M 25/08 (2013.01); F16H 3/16 (2013.01); F16H 3/32 (2013.01); F16H 63/304 (2013.01); B60Y 2200/12 (2013.01); B62M 2025/006 (2013.01); F16H 1/28 (2013.01); F16H 63/32 (2013.01); F16H 2063/3056 (2013.01)

(58) Field of Classification Search
CPC .......... F16H 63/18; F16H 3/32; F16H 63/304; F16H 63/32
USPC ........................................................ 74/337.5
See application file for complete search history.

(56) References Cited

U.S. PATENT DOCUMENTS

| | | | | | |
|---|---|---|---|---|---|
| 5,704,251 | A | * | 1/1998 | Alber | ...................... F16H 63/20 74/325 |
| 6,296,073 | B1 | * | 10/2001 | Rioux | ...................... B60K 5/02 180/233 |
| 7,878,085 | B2 | * | 2/2011 | Keyaki | .................... F02B 61/06 74/337.5 |
| 8,082,816 | B2 | * | 12/2011 | Lai | .......................... F16D 28/00 74/337.5 |
| 2007/0240955 | A1 | | 10/2007 | Zenno | |

(Continued)

FOREIGN PATENT DOCUMENTS

JP    2007285448 A    11/2007

*Primary Examiner* — Ha Dinh Ho
(74) *Attorney, Agent, or Firm* — Troutman Sanders LLP

(57) ABSTRACT

Provided is a vehicle speed-change system including the following: a transmission; a transmission case that retains the transmission; a shift mechanism that performs a speed-change operation of the transmission; and a shift actuator that operates the shift mechanism. The shift actuator includes the following: a motor; a transmission mechanism that transmits rotation of the motor; and an actuator output shaft that outputs motive power transmitted by the transmission mechanism. The shift actuator is fixed to a side surface of the transmission case, and is arranged such that at least a portion of the motor overlaps the shift mechanism in a side surface view of the vehicle.

5 Claims, 8 Drawing Sheets

(56) References Cited

U.S. PATENT DOCUMENTS

2008/0103663 A1* 5/2008 Hiroi .................. F16D 11/10
 701/54
2010/0100288 A1 4/2010 Zenno
2012/0118091 A1* 5/2012 Yamazaki .............. F16H 3/089
 74/352

* cited by examiner

VEHICLE SPEED-CHANGE SYSTEM

CROSS-REFERENCE TO RELATED APPLICATIONS

This application is based upon and claims the benefit of priority of the prior Japanese Patent Application No. 2016-112835, filed on Jun. 6, 2016, the entire contents of which are incorporated herein by reference.

BACKGROUND OF THE INVENTION

Field of the Invention

The present invention is related to a vehicle speed-change system.

Description of the Related Art

A vehicle speed-change system is known in which speed change is performed by changing the combination of speed-change gears within a transmission by means of a shift actuator in accordance with a shift operation of a rider.

In an automatic speed-change device disclosed in Patent Document 1, during a gear change, a rod reciprocates by the driving of a shift actuator and a shift cam rotates through a predetermined angle via a link mechanism. Thereby, a shift fork moves by a predetermined amount in the axial direction along a cam groove, and a pair of speed-change gears enter a state in which they are fixed to a main shaft and a drive shaft, and thus a drive force is transmitted from the main shaft to the drive shaft.
Patent Document 1: Japanese Laid-open Patent Publication No. 2007-285448

However, in the automatic speed-change device disclosed in Patent Document 1, there was a problem in that the number of parts increased because transmission from the shift actuator to the shift cam or link mechanism occurs via intermediate parts such as a rod.

SUMMARY OF THE INVENTION

In consideration of the above-described problem, an object of the present invention is to provide a vehicle speed-change system in which the number of parts for transmission from the shift actuator to the shift mechanism can be reduced.

The present invention is a vehicle speed-change system including the following: a transmission; a transmission case that retains the transmission; a shift mechanism that performs a speed-change operation of the transmission; and a shift actuator that operates the shift mechanism. The shift actuator includes the following: a motor; a transmission mechanism that transmits rotation of the motor; and an actuator output shaft that outputs motive power transmitted by the transmission mechanism. The shift actuator is fixed to a side surface of the transmission case, and is arranged such that at least a portion of the motor overlaps the shift mechanism in a side surface view of the vehicle.

DETAILED DESCRIPTION OF THE PREFERRED EMBODIMENTS

Figure 1:
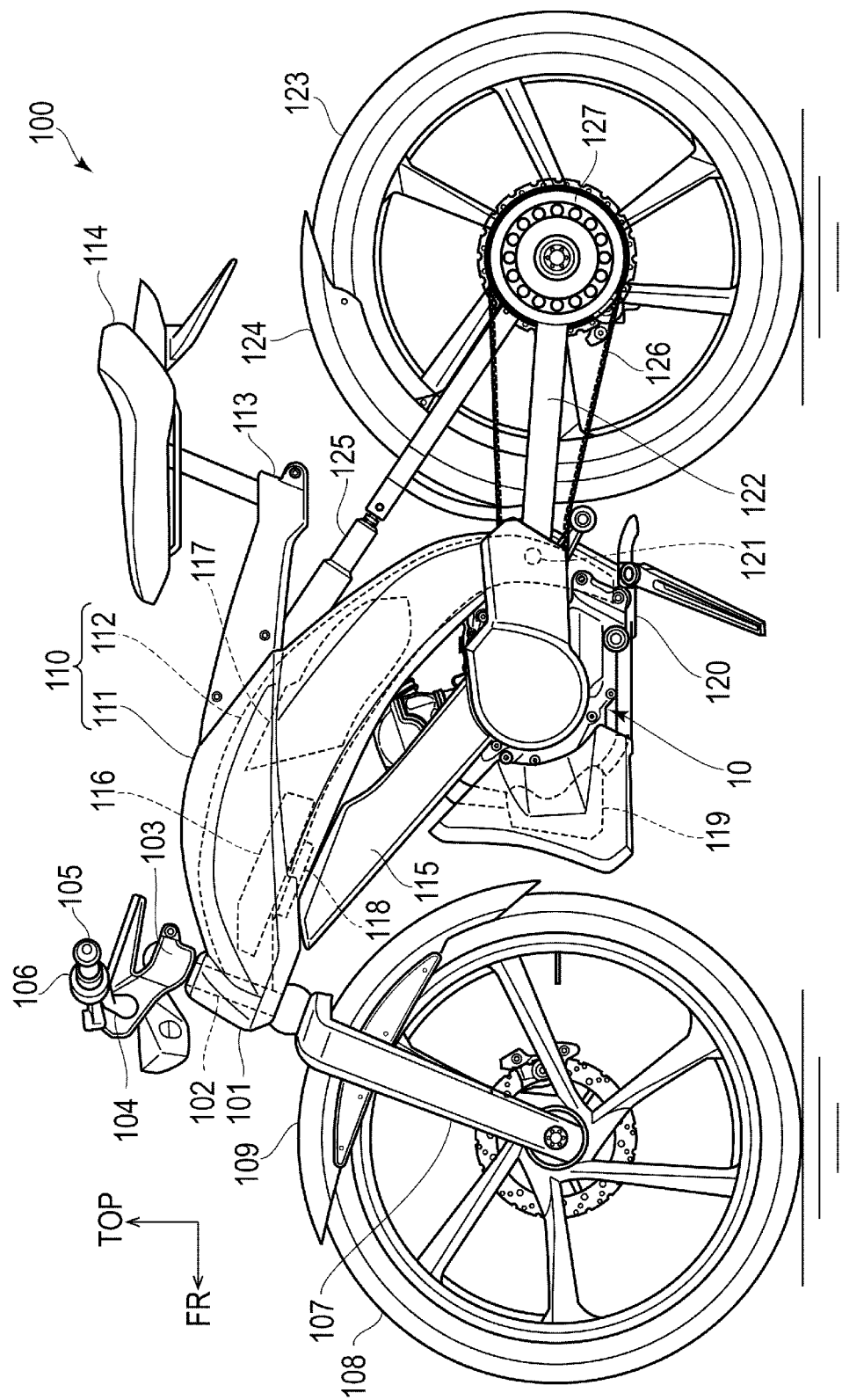
FIG. 1 is a left-side surface view illustrating the overall constitution of a motorcycle.

A suitable embodiment of a vehicle speed-change system according to the present invention will now be explained below referring to the drawings. In the present embodiment, a saddle-type vehicle, specifically a motorcycle, will be used as the vehicle.

First Embodiment

FIG. 1 is a left-side surface view illustrating the overall constitution of a motorcycle 100. In the drawings to be explained below, the front side of the vehicle is indicated by an arrow marked "FR", the top side of the vehicle is indicated by an arrow marked "TOP", and the left side of the vehicle is indicated by an arrow marked "LEFT" as necessary. Thus, the side opposite to that indicated by the arrow marked "FR" is the rear side, the side opposite to that indicated by the arrow marked "TOP" is the bottom side, and the side opposite to that indicated by the arrow marked "LEFT" is the right side.

In the front part of the motorcycle 100, a steering stem shaft 102 is supported such that it can rotate left and right by a steering head pipe 101. A handlebar 104 is fixed via a top bridge 103 to the upper end of the steering stem shaft 102. Grips 105 are attached to both ends of the handlebar 104. A shift switch 106, with which a rider performs a shift operation, is disposed at a position near one of the left and right grips 105. The rider can perform a shift-up or shift-down operation using the shift switch 106. A front fork 107 is provided to the lower end of the steering stem shaft 102. The front fork 107 extends to the left side of the vehicle, and rotatably supports a front wheel 108 in a cantilever manner. The top of the front wheel 108 is covered by a front fender 109.

A vehicle body frame 110 that extends diagonally downward to the rear in an arc shape is joined to the steering head pipe 101. The vehicle body frame 110 includes an exterior frame 111 that is exposed to the outside, and a reinforcement frame 112 that reinforces the exterior frame 111. The exterior frame 111 has a shape in which the top part and the left and right are integrally connected at the rear of the steering head pipe 101, and then the top part subsequently opens and branches to the left and right. The reinforcement frame 112 is, for example, a flat steel plate, and is constituted by a left and right pair of flat steel plates that are joined to the exterior frame 111 on the inside of the exterior frame 111.

A seat frame 113 is supported by the vehicle body frame 110. The seat frame 113 is connected to a V-shaped location where the exterior frame 111 of the vehicle body frame 110 branches to the left and right, and extends to the rear to support a seat 114.

A single-cylinder engine 10 is mounted on the vehicle body frame 110. The constitution of the engine 10 and the surroundings of the engine 10 will be explained later. The left and right of the engine 10 are covered by a cover 115 that extends diagonally downward to the rear.

A fuel tank 116 and an air cleaner box 117 are disposed from front to rear above the engine 10, between the left and right pair of reinforcement frames 112, and to the rear of the steering head pipe 101. An ECU 118 is disposed below the fuel tank 116. The ECU 118 controls the driving of the engine 10, and controls a clutch actuator 38 and a shift actuator 60 (to be explained later) in accordance with a shift operation of the rider. A chamber 119 is disposed in front of the engine 10. A muffler 120 is connected via an exhaust pipe to the chamber 119.

A swing arm pivot 121 is stretched between the left and right pair of reinforcement frames 112 at a lower rear part of the vehicle body frame 110. The swing arm pivot 121 is a pivot fulcrum of a swing arm 122, and the swing arm pivot 121 axially supports the swing arm 122 such that it can swing. The swing arm 122 extends to the rear of the vehicle, and rotatably supports a rear wheel 123 at the rear end thereof. The front and top of the rear wheel 123 are covered by a rear fender 124. A rear wheel suspension device including a shock absorber 125 is mounted between the vehicle body frame 110 and the swing arm 122. The rear wheel 123 is driven via a driven sprocket 127 onto which a belt 126 that transmits a motive force of the engine 10 is wound.

Figure 2:
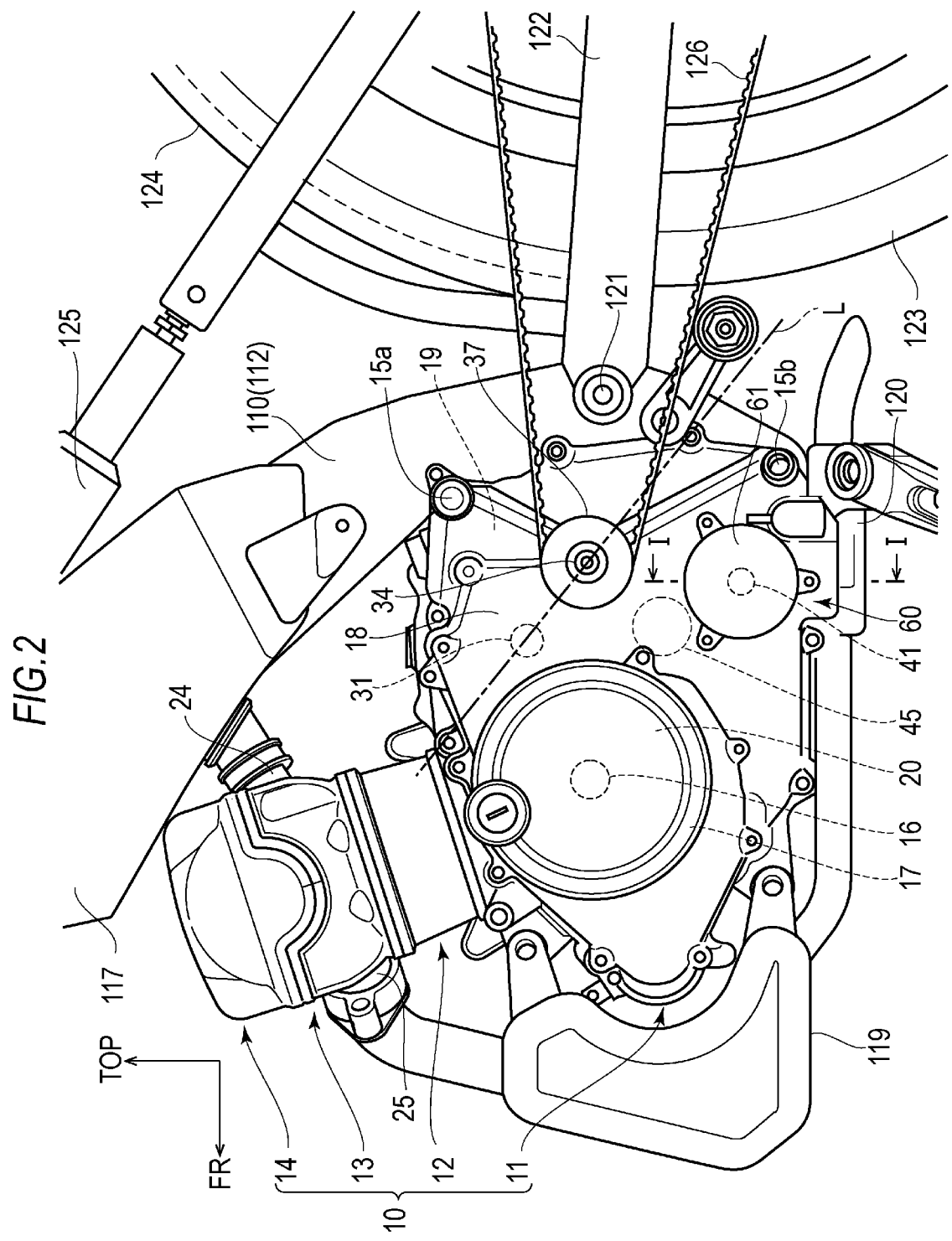
FIG. 2 is a left-side surface view illustrating the constitution around an engine in a first embodiment.
Figure 3:
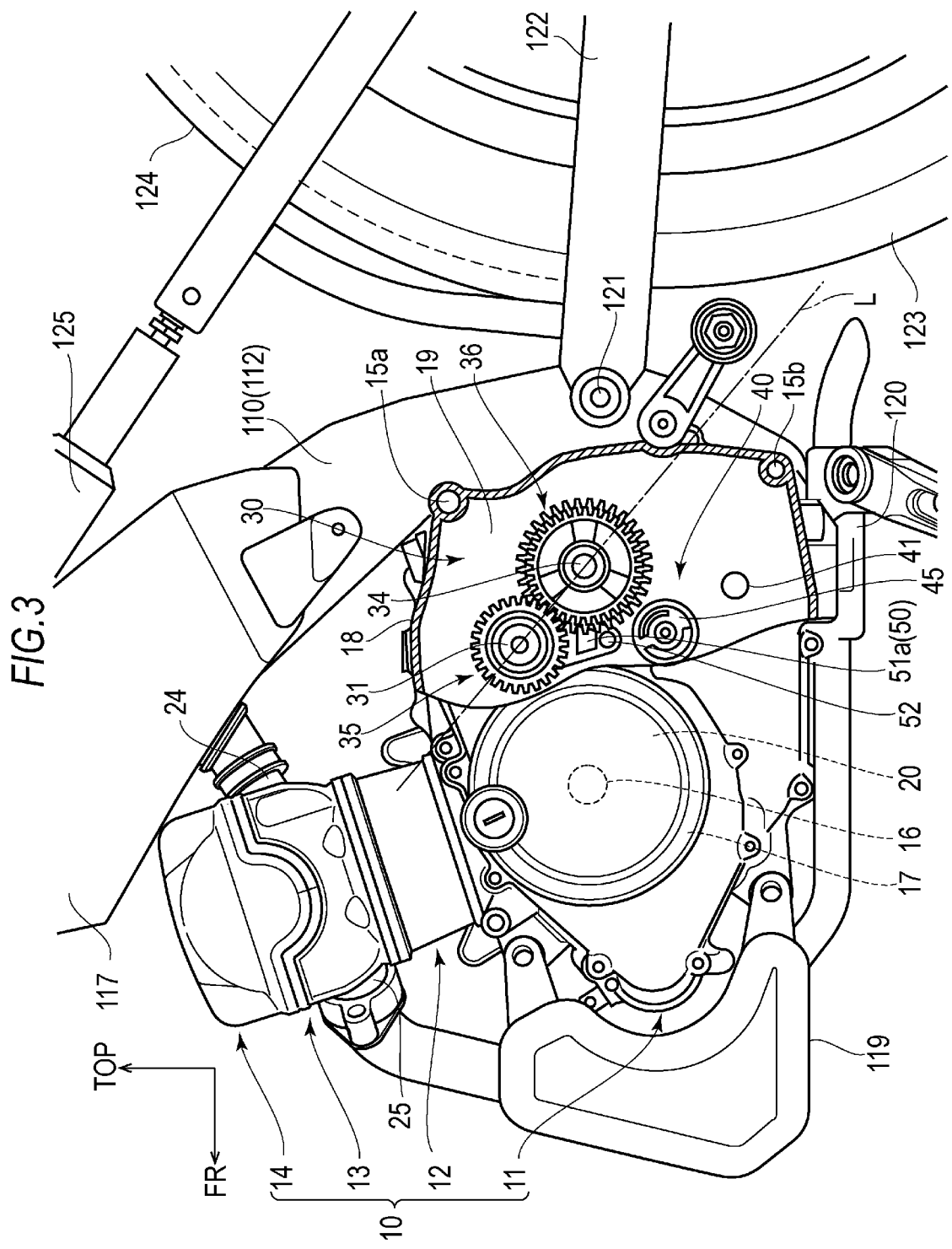
FIG. 3 is a partial cross-section view illustrating the constitution within a transmission case.
Figure 4:
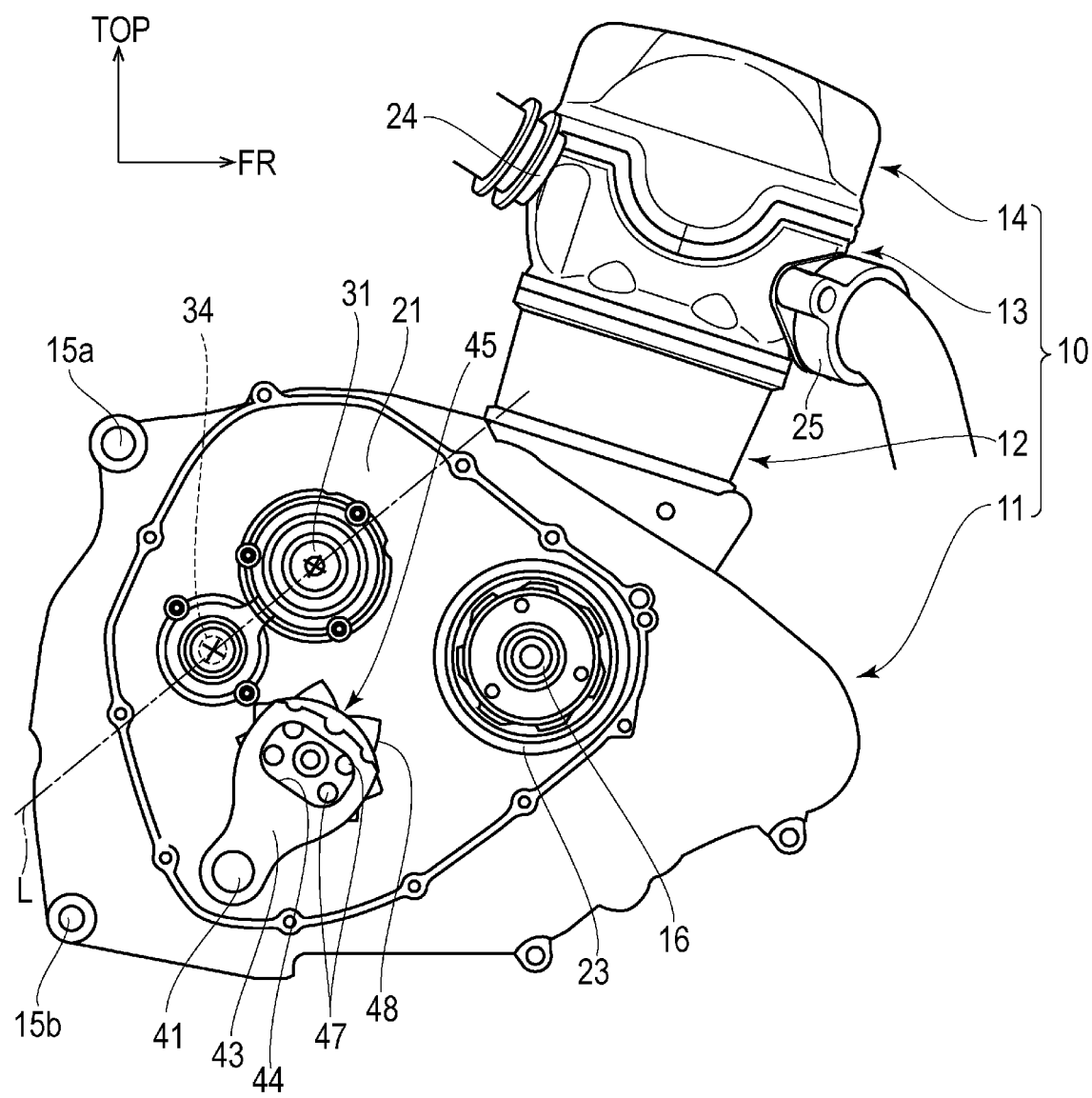
FIG. 4 is a right-side surface view illustrating the constitution around the engine.
Figure 5:
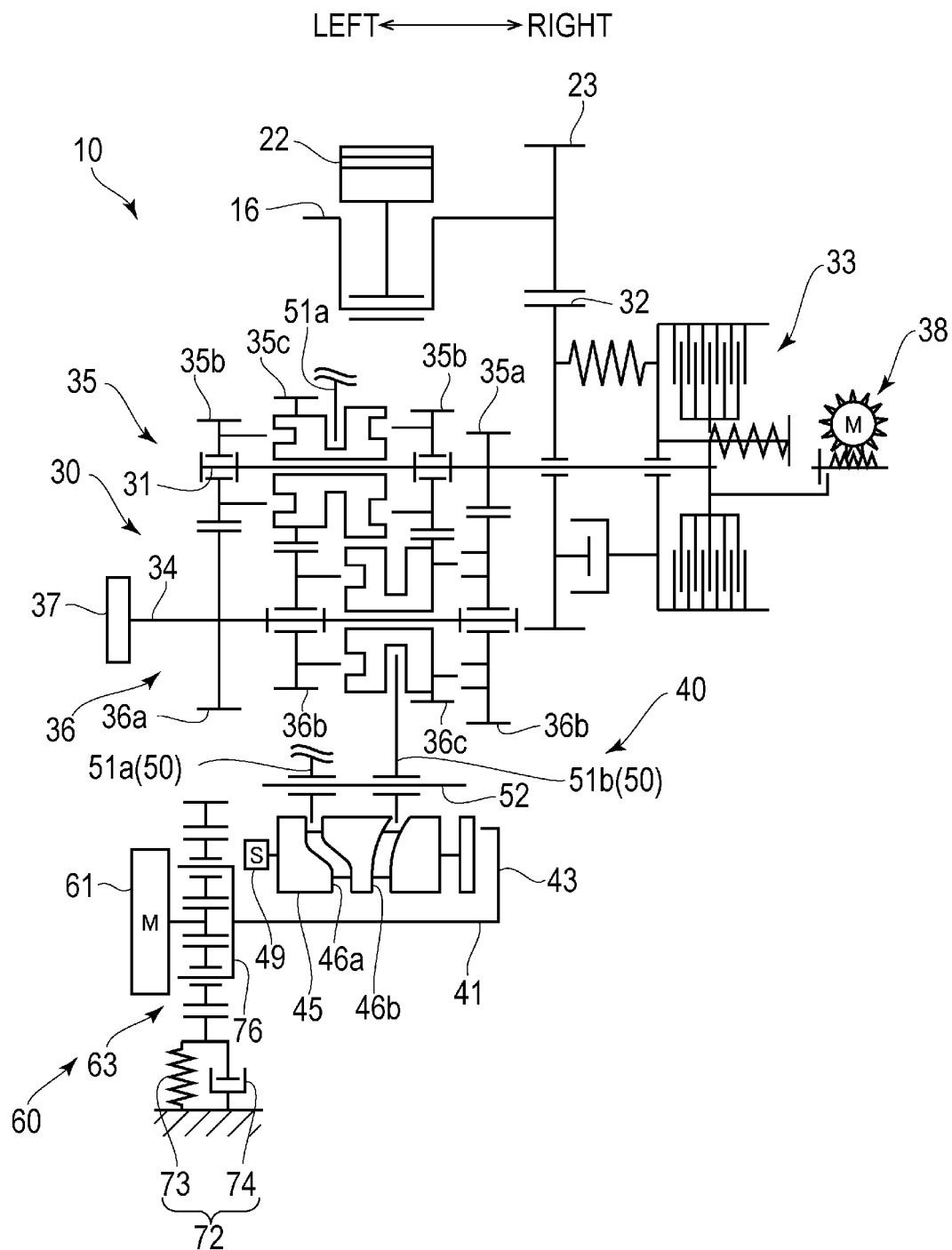
FIG. 5 is a schematic view illustrating the constitution of a speed-change system according to the first embodiment.

Next, the vehicle speed-change system according to the present embodiment will be explained referring to FIGS. 2 to 5. FIG. 2 is a left-side surface view illustrating the constitution around the engine 10. FIG. 3 is a partial cross-section view illustrating the constitution within a transmission case 18. FIG. 4 is a right-side surface view illustrating the constitution around the engine 10, and illustrates a state in which a clutch and a clutch cover have been removed. FIG. 5 is a schematic view illustrating the constitution of the vehicle speed-change system.

In the engine 10, the following are integrally joined: a crank case 11; a cylinder block 12 that extends in a forward tilting manner from the crank case 11; a cylinder head 13 that is arranged on top of the cylinder block 12; and a cylinder head cover 14 that closes the cylinder head 13 from above. The engine 10 is joined to the vehicle body frame 110 via suspension parts 15a, 15b, etc. at upper and lower positions sandwiching the swing arm pivot 121.

The crank case 11 has a crank chamber 17 that rotatably accommodates a crank shaft 16. A transmission case 18 that accommodates and retains a transmission 30 to be explained later is integrally provided to the rear of the crank case 11. In other words, the crank case 11 includes a transmission chamber 19 on the rear side of the crank chamber 17. The crank case 11 also includes a magnet chamber 20 on the left side of the crank chamber 17, and a clutch chamber 21 on the right side of the crank chamber 17 and the transmission chamber 19 (refer to FIG. 4).

Within the cylinder block 12, a piston 22 (refer to FIG. 5) is arranged such that it can reciprocate along a cylinder axial direction. The reciprocation of the piston 22 is converted into rotation of the crank shaft 16. A combustion chamber is formed between the cylinder block 12 and the cylinder head 13.

In the cylinder head 13, an intake port 24 that communicates with the combustion chamber and an exhaust port 25 are formed. A spark plug is disposed on the cylinder head 13 such that it is partially exposed within the combustion chamber. In the cylinder head 13, an intake valve is disposed within the intake port 24, and an exhaust valve is disposed within the exhaust port 25.

The cylinder head cover 14 is attached as a lid to the top of the cylinder head 13 to cover a valve system which includes the intake valve and the exhaust valve.

Next, the speed-change system which changes the speed of the rotation of the crank shaft 16 in accordance with a shift operation performed by a rider and transmits it to the belt 126 will be explained.

As shown in FIG. 5, the speed-change system includes the following: the transmission 30; the transmission case 18 (refer to FIG. 2), a clutch actuator 38; a shift mechanism 40; and a shift actuator 60.

The transmission 30 includes a counter shaft 31, a clutch 33, a drive shaft 34, and a plurality of speed-change gear groups 35, 36 which are provided to the counter shaft 31 and the drive shaft 34.

As shown in FIG. 3, the counter shaft 31 and the drive shaft 34 are arranged parallel to the crank shaft 16 within the transmission chamber 19. The counter shaft 31 is axially supported in a rotatable manner by the transmission case 18 to the rear of the crank shaft 16. The drive shaft 34 is axially supported in a rotatable manner by the transmission case 18 to the rear of the crank shaft 16 and the counter shaft 31.

As shown in FIG. 5, a primary driven gear 32, which is constantly meshed with a primary drive gear 23 that is fixed to the right end of the crank shaft 16, is fixed to the right side of the counter shaft 31. The primary driven gear 32 is disposed within the clutch chamber 21 or near the clutch chamber 21, and the clutch 33 is provided immediately to the right side of the primary driven gear 32. The clutch 33 is covered by a clutch cover (not illustrated) from the right side of the crank case 11. The clutch 33 interrupts the transmission between the primary driven gear 32 and the counter shaft 31 by the driving of the clutch actuator 38. The clutch actuator 38 has a motor and a rack-and-pinion mechanism. The clutch actuator 38 disconnects and connects the clutch 33 based on an instruction from the ECU 118 upon operation of the shift switch 106 by the rider.

The speed-change gear groups 35, 36 are provided respectively to the counter shaft 31 and the drive shaft 34.

The speed-change gear group 35 provided to the counter shaft 31 includes the following: an integral rotating gear 35a that rotates integrally with the counter shaft 31; a free rotating gear 35b that is capable of relative rotation with respect to the counter shaft 31; and a slide rotating gear 35c that is capable of reciprocal movement in the axial direction of the counter shaft 31.

A dog clutch is provided to the slide rotating gear 35c and the free rotating gear 35b that is adjacent to the slide rotating gear 35c. If the slide rotating gear 35c and the free rotating gear 35b approach each other, the dog clutch enters a connected state, and the free rotating gear 35b rotates integrally with the counter shaft 31. On the other hand, if the slide rotating gear 35c and the free rotating gear 35b separate from each other, the dog clutch enters a disconnected state, and the free rotating gear 35b enters a state in which it is capable of relative rotation with respect to the counter shaft 31.

Similarly, the speed-change gear group 36 provided to the drive shaft 34 includes the following: an integral rotating gear 36a that rotates integrally with the drive shaft 34; a free rotating gear 36b that is capable of relative rotation with respect to the drive shaft 34; and a slide rotating gear 36c that is capable of reciprocal movement in the axial direction of the drive shaft 34.

The integral rotating gear 35a provided to the counter shaft 31 and the free rotating gear 36b provided to the drive shaft 34 are constantly meshed. Similarly, the integral rotating gear 36a provided to the drive shaft 34 and the free rotating gear 35b provided to the counter shaft 31 are constantly meshed. The shift mechanism 40 moves the slide rotating gears 35c, 36c in the axial direction of the counter shaft 31 or the drive shaft 34 by driving the shift actuator 60, and changes the combination of the speed-change gear groups 35, 36 that transmit rotation from the counter shaft 31 to the drive shaft 34.

A drive sprocket 37, which rotates integrally with the drive shaft 34 and onto which the belt 126 is wound, is fixed to the left end of the drive shaft 34. Therefore, the speed of the rotation of the crank shaft 16 is changed by the transmission 30 and output to the drive sprocket 37, and then transmitted to the rear wheel 123 via the belt 126 and the driven sprocket 127.

Next, the shift mechanism 40 which changes the combination of the speed-change gear groups 35, 36 will be explained.

The shift mechanism 40 is disposed in the transmission chamber 19, and includes the following: a shift shaft 41; a shift arm 43; a shift cam 45; a shift cam sensor 49; a shift fork 50; and a shift fork shaft 52. The length of the shift mechanism 40 is shorter in the left-right direction compared to the transmission 30 having the counter shaft 31 and the drive shaft 34.

As shown in FIG. 3, the shift shaft 41 is disposed parallel to the crank shaft 16, and is axially supported in a rotatable manner at a lower position within the transmission case 18. The shift shaft 41 is positioned below the drive shaft 34. The shift shaft 41 is positioned the farthest toward the lower end among the constituent members of the shift mechanism 40. In a side surface view of the vehicle, the shift shaft 41 is arranged below a straight line L (dot-dash line) that connects the center axis of the counter shaft 31 and the center axis of the drive shaft 34. The shift shaft 41 rotates by the driving of the shift actuator 60. Specifically, the shift shaft 41 rotates in one direction in a shift-up operation, and rotates in the other direction in a shift-down operation. As shown in FIG. 4, a shift arm 43 that swings in accordance with the rotation of the shift shaft 41 is fixed to the right end of the shift shaft 41. The shift arm 43 has a plate shape which forms a spatula shape extending forward and diagonally upwards, and the shift arm 43 is disposed so as to cover the shift cam 45 from the right side. An approximately rectangular-shaped opening 44, which engages with a portion of the shift pins 47 (to be explained later) of the shift cam 45, is formed in the shift arm 43. The shift arm 43 swings in either the front or rear direction centered on the shift shaft 41 in accordance with the rotation of the shift shaft 41, and is biased to return to a neutral state after swinging.

The shift cam 45 performs the speed-change operation in the transmission 30. The shift cam 45 is disposed parallel to the crank shaft 16, and is axially supported in a rotatable manner at a position slightly below the center of the transmission case 18. The shift cam 45 is positioned below the counter shaft 31 and above the shift shaft 41. In a side surface view of the vehicle, the shift cam 45 is arranged below the straight line L that connects the center axis of the counter shaft 31 and the center axis of the drive shaft 34. As shown in FIG. 5, the shift cam 45 is a cylindrical cam, and cam grooves 46a, 46b are formed in a predetermined number and a predetermined shape on the outer peripheral surface of the shift cam 45. As shown in FIG. 4, a plurality of shift pins 47 are provided on the right end surface of the shift cam 45. Some of the plurality of shift pins 47 engage within the opening 44 of the shift arm 43. Therefore, when the shift arm 43 swings, the shift cam 45 rotates via a portion of the engaged shift pins 47. Once the shift arm 43 has returned to the neutral state after swinging, the shift arm 43 engages with shift pins 47 different from the shift pins 47 that were engaged in the neutral state before swinging.

On the outer peripheral surface at the right end of the shift cam 45, recessed positioning parts 48 are formed at equal intervals in the circumferential direction. The positioning parts 48 are biased in a direction in which a shift cam stopper (not illustrated) engages with the positioning parts 48, and by engaging with the positioning parts 48, the rotational position of the shift cam 45 is determined.

As shown in FIG. 5, the shift cam sensor 49 is arranged near the shift cam 45. The shift cam sensor 49 detects the rotational position of the shift cam 45, and transmits information of the detected rotational position to the ECU 118.

The shift fork 50 is supported such that it can reciprocate along the shift fork shaft 52. The shift fork shaft 52 is disposed parallel to the counter shaft 31 and the drive shaft 34, and is axially supported by the transmission case 18. The shift fork 50 is provided with a counter-side shift fork 51a and a drive-side shift fork 51b.

The counter-side shift fork 51a engages with the cam groove 46a of the shift cam 45, and also engages with the slide rotating gear 35c provided to the counter shaft 31. In FIG. 5, a portion of the counter-side shift fork 51a is omitted from the drawing. Meanwhile, the drive-side shift fork 51b engages with the cam groove 46b of the shift cam 45, and also engages with the slide rotating gear 36c provided to the drive shaft 34.

When the shift cam 45 rotates, the counter-side shift fork 51a and the drive-side shift fork 51b move in the axial direction of the shift fork shaft 52 according to the shapes of the cam grooves 46a, 46b. In accordance with the movement thereof, the counter-side shift fork 51a makes the slide rotating gear 35c move in the axial direction of the counter shaft 31. Meanwhile, in accordance with the movement thereof, the drive-side shift fork 51b makes the slide rotating gear 36c move in the axial direction of the drive shaft 34. Due to this movement of the slide rotating gears 35c, 36c, the transmission path from the counter shaft 31 to the drive shaft 34, or in other words the combination of the speed-change gear groups 35, 36, is changed.

The shift actuator 60 operates the shift mechanism 40 based on an instruction from the ECU 118 upon operation of the shift switch 106 by the rider. As shown in FIG. 2, the shift actuator 60 is separated from the cylinder block 12 which is a heat source, and is fixed to the left-side surface of the transmission case 18. In addition, in a side surface view of the vehicle, the shift actuator 60 is arranged below the straight line L that connects the center axis of the counter shaft 31 and the center axis of the drive shaft 34. Herein, in a side surface view of the vehicle, the shift actuator 60 is arranged so as to overlap the shift mechanism 40. Specifically, in a side surface view of the vehicle, the shift actuator 60 is arranged such that a motor 61 (to be explained later) of the shift actuator 60 overlaps the shift shaft 41. The outer shape of the shift actuator 60 is approximately a flat (wherein the thickness is smaller than the diameter) columnar shape, and the shift actuator 60 is arranged such that axis thereof is parallel to the left-right direction.

Figure 6:
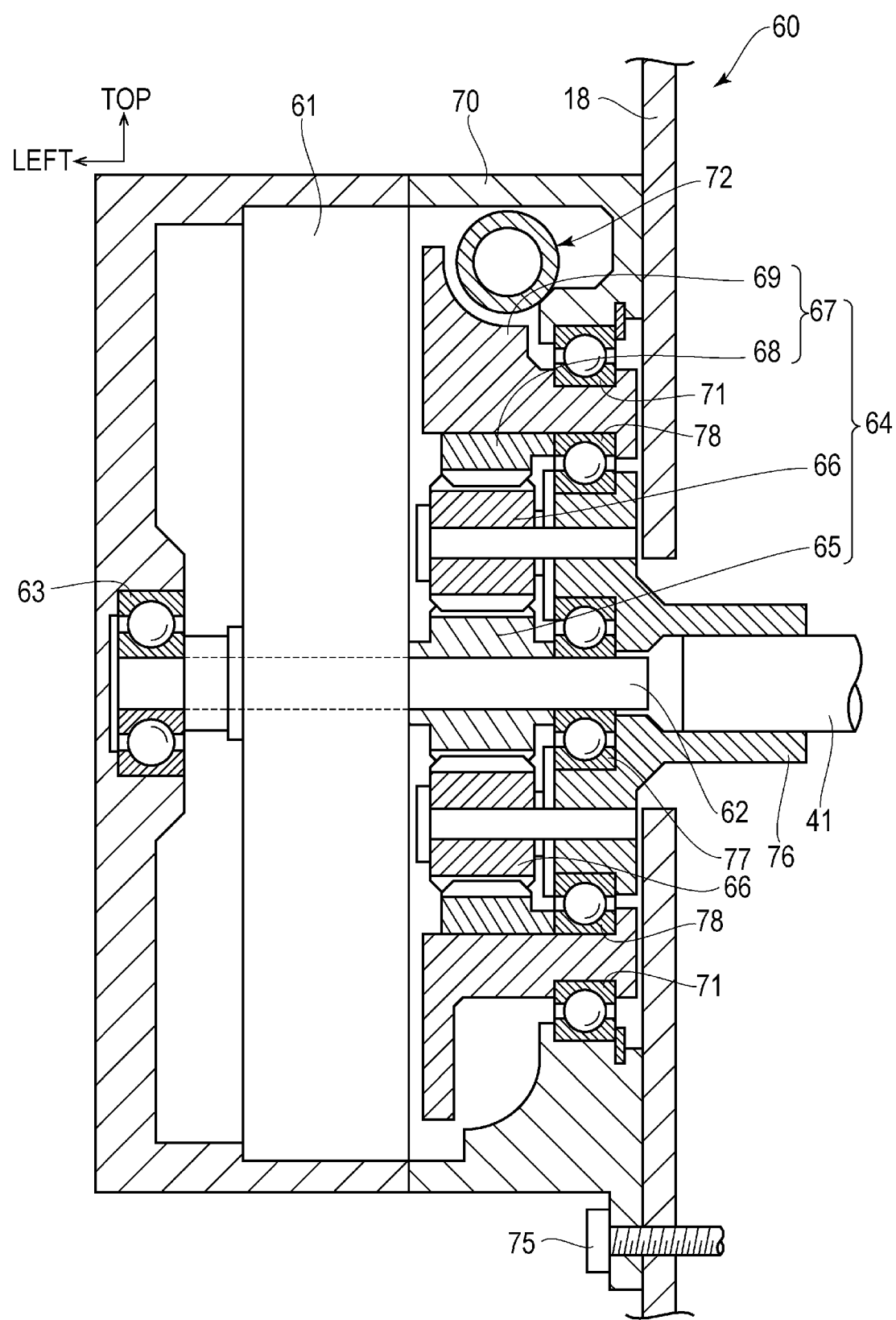
FIG. 6 is a cross-section view illustrating the constitution of a shift actuator.

FIG. 6 is a cross-section view of the shift actuator 60 shown in. FIG. 2 when cut along line I-I.

As shown in FIG. 6, the shift actuator 60 includes the following: a motor 61; a transmission mechanism 64; a housing 70; a buffer mechanism 72; and an actuator output shaft 76.

The motor 61 is approximately a flat columnar shape, and the motor 61 is arranged within the housing 70 in a state in which it is axially supported by a bearing 63 such that the axis of the output shaft 62 falls along the left-right direction.

The transmission mechanism 64 is a planetary gear mechanism, and includes a sun gear 65, a plurality of planetary gears 66, and a ring gear 67. The sun gear 65 is fixed to the output shaft 62 of the motor 61, and rotates integrally in accordance with the rotation of the output shaft 62 of the motor 61. The plurality of planetary gears 66 mesh with the sun gear 65, and revolve around the sun gear 65. The ring gear 67 meshes with the plurality of planetary gears 66 so as to surround the planetary gears 66. The ring gear 67 is constituted by an inner part 68, which includes a gear, and an outer part 69 which are integrated with each other. In the ring gear 67 of the present embodiment, the outer part 69 is attached to the housing 70 via a bearing 71 and the buffer mechanism 72. In other words, the ring gear 67 is not completely fixed to the housing 70, and can rotate slightly around the axial direction within a rotation range that is restricted by the buffer mechanism 72.

The housing 70 accommodates the motor 61, and accommodates the transmission mechanism 64 in a state in which the transmission mechanism 64 is supported in a floating state via the buffer mechanism 72. The housing 70 is fastened by a bolt 75 to the left side surface of the transmission case 18, and thereby the shift actuator 60 is fixed to the left side surface of the transmission case 18.

The buffer mechanism 72 is constituted by, for example, a spring 73 that serves as a biasing member and a damper 74 that serves as a friction member (refer to FIG. 5), and the buffer mechanism 72 is disposed between the ring gear 67 and the housing 70. When a force acts on the ring gear 67 to cause the ring gear 67 to rotate momentarily around its axis, the buffer mechanism 72 buffers the rotation of the ring gear 67 while allowing slight rotation thereof to return the ring gear 67 to its original position.

The actuator output shaft 76 outputs rotation of the motor 61 transmitted by the transmission mechanism 64 to the outside of the shift actuator 60. The actuator output shaft 76 is axially supported in a rotatable manner by a bearing 77 disposed on the outer periphery of the output shaft 62 of the motor 61 and a bearing 78 disposed on the inner periphery of the ring gear 67. The actuator output shaft 76 is connected to the plurality of planetary gears 66, and rotates in accordance with the revolution of the planetary gears 66. In other words, the actuator output shaft 76 functions as a carrier of the planetary gear mechanism. The actuator output shaft 76 is fixed to the shift shaft 41. In other words, the shift shaft 41 rotates integrally in accordance with the rotation of the actuator output shaft 76. The output shaft 62 of the motor 61, the actuator output shaft 76, and the shift shaft 41 are on the same axis.

Therefore, when the motor 61 of the shift actuator 60 rotates, the sun gear 65 rotates in accordance with the rotation of the output shaft 62. Due to the rotation of the sun gear 65, the plurality of planetary gears 66 revolve around the sun gear 65, and thus the actuator output shaft 76 connected to the plurality of planetary gears 66 rotates. By using the planetary gear mechanism in the shift actuator 60, the speed of the rotation from the motor 61 is reduced and then this rotation is transmitted to the actuator output shaft 76.

Next, in the speed-change system constituted as described above, the operation when a rider has performed a shift-up or shift-down operation using the shift switch 106 will be explained.

First, upon receiving shift-up or shift-down information from the shift switch 106, the ECU 118 drives the clutch actuator 38 to disconnect the clutch 33.

Herein, in the case that the ECU 118 has received shift-up information from the shift switch 106, the ECU 118 drives the motor 61 of the shift actuator 60 in one of the rotation directions for a predetermined time. Thus, the speed of the rotation from the output shaft 62 of the motor 61 is reduced and then this rotation is transmitted to the shift shaft 41 via the transmission mechanism 64 and the actuator output shaft 76, and the shift cam 45 rotates by a fixed angle in a predetermined direction via the shift arm 43 from the shift shaft 41. Due to this rotation of the shift cam 45 in a predetermined direction, the shift fork 50 moves the slide rotating gears 35c, 36c to change the combination of the speed-change gear groups 35, 36, and thereby the shift-up speed change is performed automatically.

On the other hand, in the case that the ECU 118 has received shift-down information from the shift switch 106, the ECU 118 drives the motor 61 of the shift actuator 60 in the other rotation direction for a predetermined time. Thus, the shift cam 45 rotates in a direction different from the predetermined direction mentioned above. Due to this rotation, the shift fork 50 moves the slide rotating gears 35c, 36c to change the combination of the speed-change gear groups 35, 36, and thereby the shift-down speed change is performed automatically.

If an upper limit of shift-up or a lower limit of shift-down has been detected by the shift cam sensor 49, the ECU 118 performs a process to cancel the shift operation by the rider even if the ECU 118 has received information of a shift-up exceeding the upper limit or a shift-down exceeding the lower limit from the shift switch 106.

Finally, the ECU 118 drives the clutch actuator 38 to connect the clutch 33, and thereby the speed change by the speed-change system is completed.

According to the present embodiment described above, the shift actuator 60 includes the following: the motor 61; the transmission mechanism 64 that transmits rotation of the motor 61; and the actuator output shaft 76 that outputs motive power transmitted by the transmission mechanism 64. The shift actuator 60 is fixed to a side surface of the transmission case 18, and is arranged such that at least a portion of the motor 61 overlaps the shift mechanism 40 in a side surface view of the vehicle. Therefore, the distance from the shift actuator 60 to the shift mechanism 40 becomes shorter, and the number of parts for transmitting motive power from the shift actuator 60 to the shift mechanism 40 can be reduced. Thus, the weight of the speed-change system can be decreased and noise can also be reduced.

Further, regardless of the presence/absence of the shift actuator 60, the transmission 30 and the shift mechanism 40 can be communalized, and thus the maintainability and producibility of the speed-change system can be improved. By arranging the shift actuator 60 so that the motor 61 thereof overlaps the shift mechanism 40 which is shorter in the left-right direction than the parts of the transmission 30, the shift actuator 60 can be prevented from protruding greatly to the outside of the transmission case 18. In addition, by fixing the shift actuator 60 to the side surface of the transmission case 18, the cooling efficiency by outside air can be enhanced.

According to the present embodiment, in the shift actuator 60, the actuator output shaft 76 rotates the shift shaft 41. In other words, the actuator output shaft 76 directly makes the shift shaft 41 rotate, and thereby the number of parts for transmitting motive power from the shift actuator 60 to the shift shaft 41 can be reduced.

According to the present embodiment, since the transmission mechanism 64 is a planetary gear mechanism, a desired reduction ratio can be easily obtained by adjusting the number of teeth without having to mesh the gears over multiple stages. In other words, the length in the left-right direction of the shift actuator 60 can be shortened, and the size of the engine 10 can be reduced. Further, by using the planetary gear mechanism, the reduction ratio can be increased, the load of the motor 61 can be reduced, and the size and thickness of the motor 61 can be reduced.

According to the present embodiment, the shift actuator 60 includes the housing 70 that accommodates the transmission mechanism 64, and the buffer mechanism 72 disposed between the housing 70 and the ring gear 67. Therefore, the buffer mechanism 72 buffers a reaction force when the speed-change gear groups 35, 36 mesh with each other during a speed change while also allowing movement of the ring gear 67, and thus the load on the planetary gears 66 can be reduced.

Second Embodiment

In the first embodiment, a case was explained in which the shift actuator 60 indirectly rotates the shift cam 45 via the shift shaft 41 and the shift arm 43. In the present embodiment, a case will be explained in which the shift actuator 60 directly rotates the shift cam 45.

Figure 7:
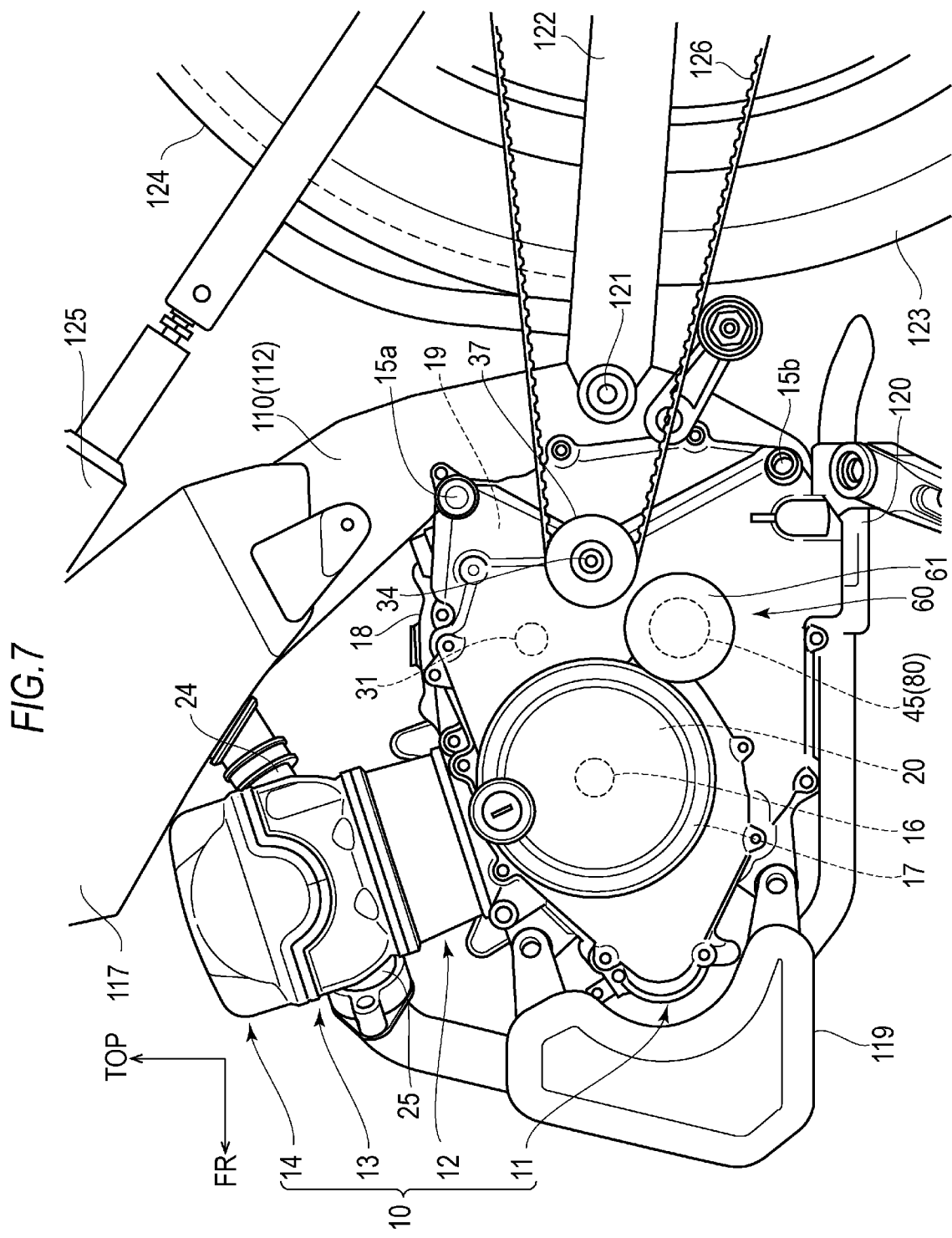
FIG. 7 is a left-side surface view illustrating the constitution around an engine in a second embodiment.
Figure 8:
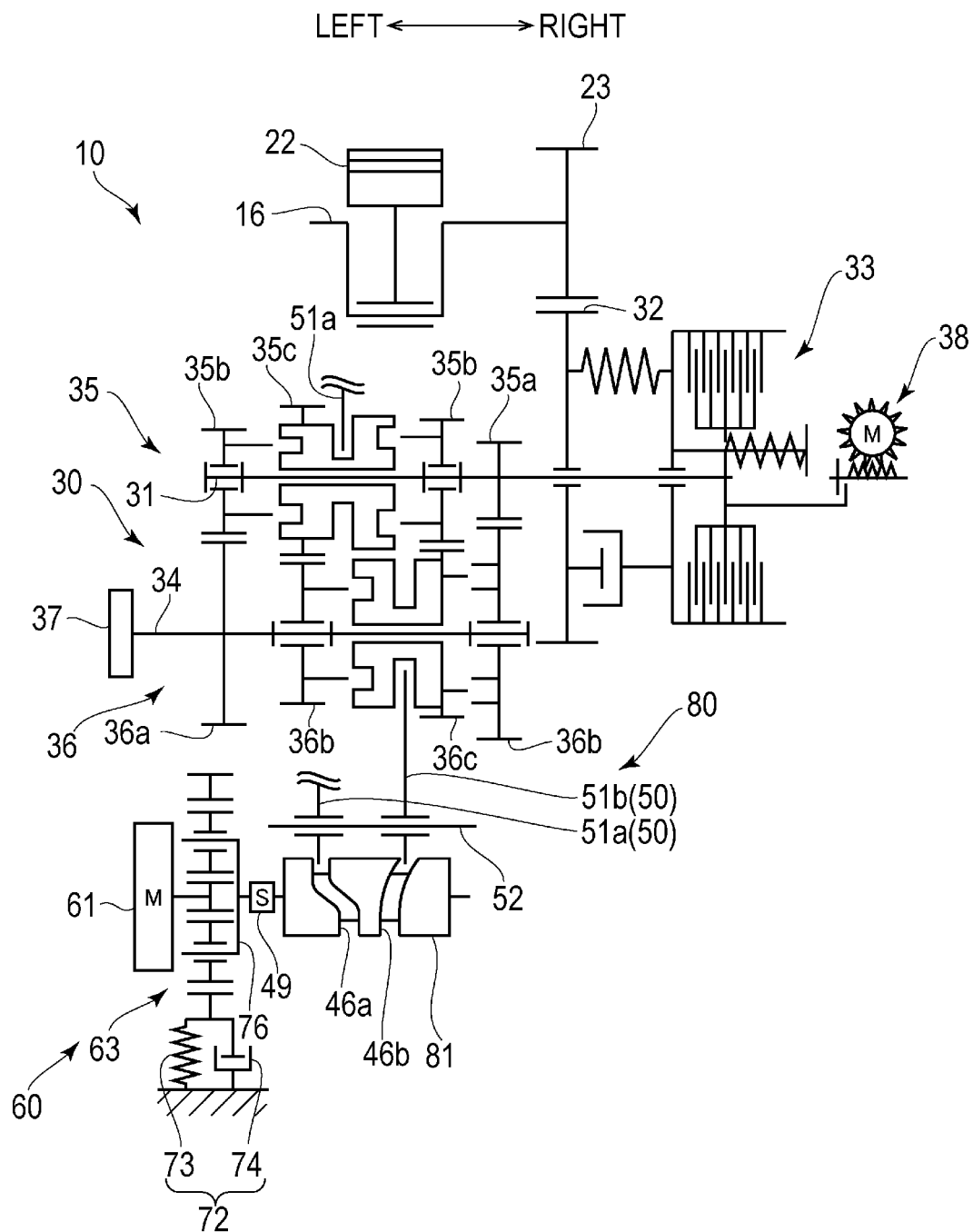
FIG. 8 is a schematic view illustrating the constitution of a speed-change system according to the second embodiment.

FIG. 7 is a left-side surface view illustrating the constitution around the engine 10 in the second embodiment. FIG. 8 is a schematic view illustrating the constitution of a speed-change system according to the second embodiment. The constitutions which are identical to those of the first embodiment will be assigned the same reference numerals.

As shown in FIG. 7, the shift actuator 60 is fixed to the left side surface of the transmission case 18. In the present embodiment, the shift actuator 60 is arranged so that the motor 61 of the shift actuator 60 overlaps the shift cam 45 of a shift mechanism 80 in a side surface view of the vehicle.

As shown in FIG. 8, the shift mechanism 80 of the present embodiment includes the following: a shift cam 81; the shift cam sensor 49; the shift fork 50; and the shift fork shaft 52. The actuator output shaft 76 is coaxially fixed via the shift cam sensor 49 to the shift cam 81. In this way, in the shift mechanism 80 of the present embodiment, the shift shaft 41 and the shift arm 43 of the shift mechanism 40 of the first embodiment are eliminated.

According to the present embodiment, when the motor 61 of the shift actuator 60 rotates, the actuator output shaft 76 directly operates the shift cam 45. In other words, the shift cam 45 fixed to the actuator output shaft 76 can be directly rotated by the rotation of the motor 61 of the shift actuator 60. Thus, the constitution of the speed-change system can be simplified, and the size of the engine 10 can be reduced. Further, motive power can be precisely and accurately transmitted from the actuator output shaft 76 to the shift cam 45.

In addition, since the shift shaft 41 and the shift arm 43 can be eliminated, the load of the motor 61 is reduced, and the shift actuator 60 can be efficiently driven. Therefore, the size of the motor 61 can be reduced, and the number or diameter of the gears for reducing the speed can be reduced.

The shift cam sensor 49 which is positioned between the actuator output shaft 76 and the shift cam 81 may be disposed on the opposite side of the actuator output shaft 76.

The present invention has been explained above together with various embodiments, but the present invention is not limited to these embodiments. Modifications and the like are permissible within the scope of the present invention, and the embodiments above may be combined.

In the above embodiments, a case was explained in which the shift actuator 60 is fixed to the left side surface of the crank case 11, or specifically to the left side surface of the transmission case 18, but the present invention is not limited thereto. The shift actuator 60 may be fixed to the right side surface of the crank case 11, or specifically to the right side surface of the transmission case 18. Further, the shift actuator 60 may be disposed above the swing arm pivot 121. Alternatively, the shift actuator 60 may be disposed above the straight line L that connects the center axis of the counter shaft 31 and the center axis of the drive shaft 34.

In the first embodiment, a case was explained in which the shift actuator 60 rotates the shift shaft 41, and in the second embodiment, a case was explained in which the shift actuator 60 rotates the shift cam 45, but the present invention is not limited thereto. For example, the shift shaft 41 may be eliminated from the shift mechanism 40, and the shift actuator 60 may rotate the shift arm 43.

In the above embodiments, a case was explained in which the vehicle is a motorcycle, but the present invention is not limited thereto, and may be applied to three-wheeled or four-wheeled vehicles, etc. as long as the vehicle has a similar speed-change system. However, the shift actuator 60 can be more optimally arranged when the present invention is applied to a saddle-type vehicle, in which the axial direction of the counter shaft 31 and the drive shaft 34 of the transmission 30 is oriented along the left-right direction, and the axial direction of the shift cam 45 of the shift mechanism 40 and the shift fork shaft 52 is oriented along the left-right direction.

According to the present invention, the number of parts for transmission from the shift actuator to the shift mechanism can be reduced.

What is claimed is:

1. A vehicle speed-change system comprising the following:
   a transmission;
   a transmission case that retains the transmission;
   a shift mechanism that performs a speed-change operation of the transmission; and
   a shift actuator that operates the shift mechanism,
   wherein the shift actuator comprises:
      a motor;
      a transmission mechanism that transmits rotation of the motor; and
      an actuator output shaft that outputs motive power transmitted by the transmission mechanism, and
   wherein the shift actuator is fixed to a side surface of the transmission case, and is arranged such that at least a portion of the motor overlaps the shift mechanism in a side surface view of the vehicle.

2. The vehicle speed-change system according to claim 1, wherein the shift mechanism comprises:
   a shift cam;
   a shift fork that slides in accordance with rotation of the shift cam to change a combination of speed-change gears;
   a shift arm that rotates the shift cam; and
   a shift shaft that swings the shift arm, wherein the actuator output shaft of the shift actuator rotates the shift shaft.

3. The vehicle speed-change system according to claim 1, wherein the shift mechanism comprises:
- a shift cam; and
- a shift fork that slides in accordance with rotation of the shift earn to change a combination of speed-change gears,
- wherein the actuator output shaft of the shift actuator rotates the shift cam.

4. The vehicle speed-change system according to claim 1, wherein the transmission mechanism is a planetary gear mechanism.

5. The vehicle speed-change system according to claim 1, wherein the transmission mechanism comprises:
- a sun gear that rotates integrally with the motor;
- a planetary gear that meshes with the sun gear; and
- a ring gear that meshes with the planetary gear,
- wherein the shift actuator further comprises:
  - a housing that accommodates the transmission mechanism; and
  - a buffer mechanism disposed between the housing and the ring gear.

\* \* \* \* \*